United States Patent [19]

Shu

[11] Patent Number: 5,896,200
[45] Date of Patent: Apr. 20, 1999

[54] OPTICAL DESIGN FOR LASER ENCODER RESOLUTION EXTENSION AND ANGULAR MEASUREMENT

[75] Inventor: Deming Shu, Darien, Ill.

[73] Assignee: The University of Chicago, Chicago, Ill.

[21] Appl. No.: 08/902,115

[22] Filed: Jul. 29, 1997

[51] Int. Cl.$^6$ .................................................. G01B 11/14
[52] U.S. Cl. .................................................... 356/373
[58] Field of Search ............................. 250/206.1–206.3, 250/237 R, 231.13–231.19, 231.1–231.12, 237 G, 234–236, 559.23, 559.29, 559.31, 559.37, 559.49; 33/707; 356/399–401, 373, 375, 376, 374, 356, 358, 138, 139, 139.01–139.1, 140, 141.1–141.5, 147, 150, 151, 152.1–152.3, 153, 154, 3, 3.01–3.16, 4.01–4.1, 5.01–5.15, 27, 28, 28.5

[56] References Cited

U.S. PATENT DOCUMENTS 4,922,307  5/1990  Schaffer .

FOREIGN PATENT DOCUMENTS 1350488  11/1987  U.S.S.R. .
1384948  3/1988   U.S.S.R. .

*Primary Examiner*—K. P. Hantis
*Attorney, Agent, or Firm*—Mason, Kolehmainen, Rathburn & Wyss

[57] ABSTRACT

A laser Doppler encoder includes a set of prisms mounted on a fixed base along with an additional prism, an end retroreflector and a laser/detector and a second set of prisms mounted on a moving/rotating base. The laser/detector generates a laser beam that is transmitted through the sets of prisms on the fixed and moving bases as well as the additional prism and the end retroreflector until the laser beam finally reaches a heterodyning detector that is housed coaxially inside the laser/detector. The laser beam is a frequency-stabilized laser beam such that the laser beam that is reflected back to the heterodyning detector is frequency-shifted by the movement of the moving base relative to the fixed base so that the amount of movement (either rotational or linear) of the moving base can be accurately determined. Moreover, the end retroreflector enables the laser Doppler encoder to be readily self-aligned such that the alignment time is substantially reduced and the three-dimensional optical path configuration results in a compact and integrated optical design which optimizes the system's anti-vibration performance. The laser Doppler encoder can be used in conjunction with a high energy resolution monochromator for accurately determining the rotational movement of an arm in the monochromator or can be used in conjunction with a closed looped motion controller for providing feedback on the rotational displacement of the arm of the monochromator so that the arm can be accurately positioned.

20 Claims, 6 Drawing Sheets

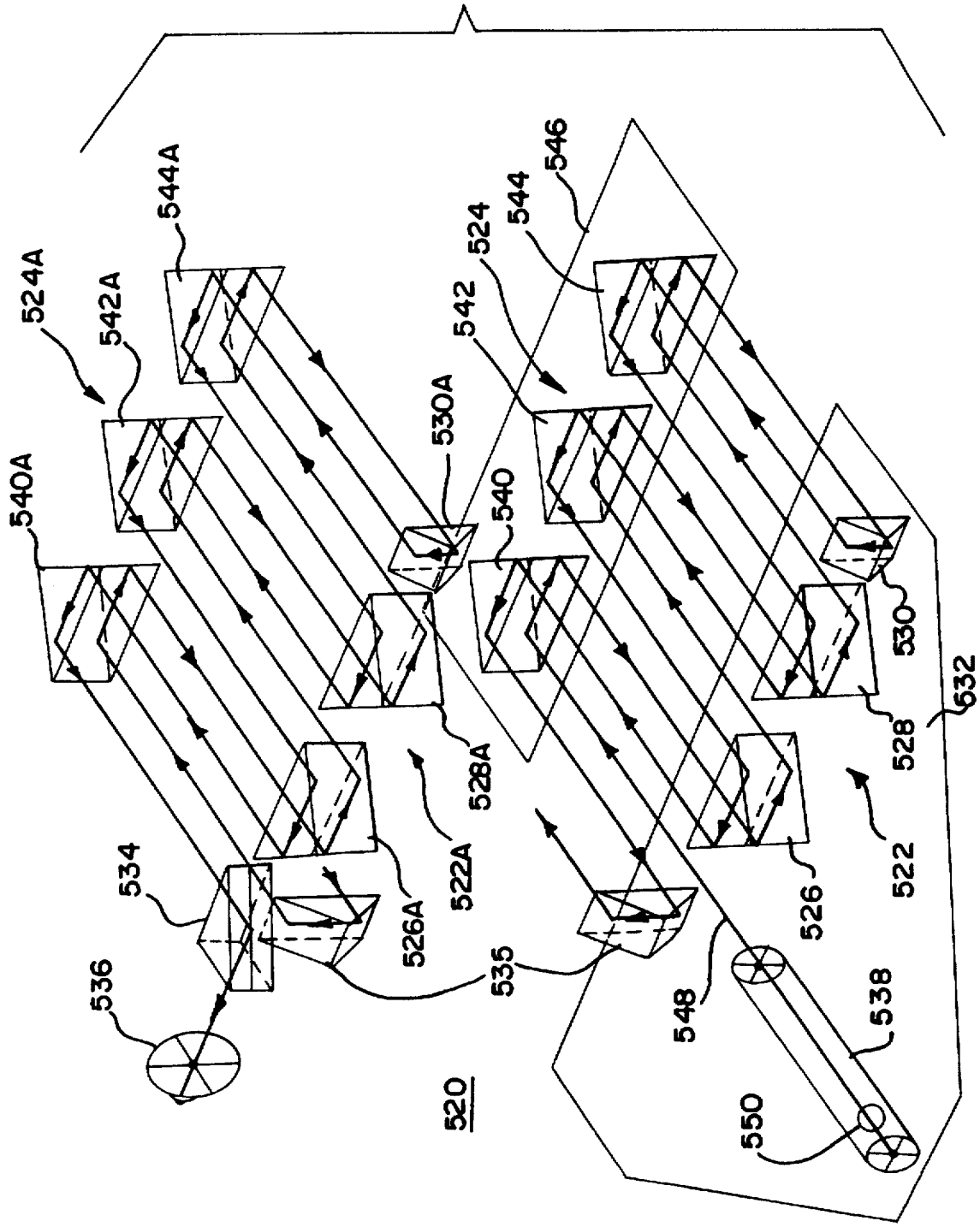

OPTICAL DESIGN FOR LASER ENCODER RESOLUTION EXTENSION AND ANGULAR MEASUREMENT

CONTRACTUAL ORIGIN OF THE INVENTION

The United States Government has rights in this invention pursuant to Contract No. W-31-109-ENG-38 between the United States Government and Argonne National Laboratory.

BACKGROUND OF THE INVENTION

1. Field of the Invention

This invention relates to a relatively compact encoder apparatus for precisely measuring linear motion and angular rotation values, and more particularly, to a new and improved laser Doppler encoder that incrementally measures linear and angular displacements by transmitting a laser beam through a self-aligning, multiple reflective optical path.

2. Background of the Invention

It has becomes necessary in connection with manufacturing in high technology industries to very precisely control the motion of tools, automated robots, and control and metrology instrumentation. For example, such precise control of tools has become almost a necessity in lithography, chip manufacturing, and X-ray micromachining for microsensors. In addition, the study of materials and new science with X-rays, such as in the fields of DNA, human genome and structural biology, require high precision motion and detector systems which should function with tolerances in atomic and sub-atomic dimensions (usually a few Angstrom-nanometer levels). In this regard, typical research tools include high-resolution X-ray monochromators (for precise energy discrimination typically one part in a million or better), large-field scanning microscopes, profilometers, and X-ray microscopes.

Linear and angular encoders are digital devices that are utilized in these technologies and instrumentation to determine precisely linear motions and angular rotations of components. The encoders are currently available with resolutions limited to several tenths of a manometer and a few nano-radians in linear and angular resolution, respectively, and are generally limited to linear measurements in about the millimeter range and angular measurements in about a sub-degree range.

In connection with laser Doppler angular encoders (LDAE), no commercially available angular encoder provides a sub-nano-radian resolution in the 5–8 degree measuring range (a laboratory setup encoder has been reported that has achieved a resolution of a few nano-radians, but this is a large setup (about 610 mm×1220 mm) that is based on a polarization-encoded Michelson interferometer principle such that the measuring speed is undesirably slow). In the much larger 10–20 nano-radian (nrad) resolution range, an angular sensor currently on the market (Applied Geomechanics, Model-520) has a 10-nrad resolution, but this sensor only covers a measuring range of less than 0.01 degree with a very long measuring settling time (0.1–30 seconds). In the still larger 20–100 nrad resolution range, laser-based machine tool calibration systems exist, such as Hewlett Packard HP-5527B and Zygo ZMI-1000. From a few degrees up to 20-degree angular measuring range, these units provide a 20–100 nrad angular resolution, which is about two orders of magnitude less precise than what needs to be obtained in such a system. In the field of grating-based optical encoders, a model ROD-800 from Heidenhain is available. This encoder has a 250 nrad resolution with a 360-degree measuring range.

As can be appreciated, these types of available encoders are not acceptable for applications where very precise angular rotations measurements (for example, sub-nano-radian angular resolution) are required over at least a 5–8 degree measuring range. What is needed is a relatively compact encoder that provides an adequate, very precise resolution in an acceptable measuring range while providing a relatively fast measuring speed.

In connection with laser Doppler linear encoders (LDLE), a near-Angstrom linear encoder is a critical component for the successful development of a sub-nanometer resolution X-ray microprobe and a mirror-based X-ray interferometer. The development of a high-resolution X-ray microscope using near-Angstrom linear encoder technology could offer unprecedented capabilities for studying grain boundaries, interfaces, structures of materials and biological systems. The X-ray interferometer technology also can be valuable to calibrate the linear encoder.

The best currently available near-Angstrom linear sensor is based on the principle of capacitance measurement and has about 0.7 Angstrom resolution. However, its measuring range is only about 20 µm with 2.5 mm/sec maximum measuring speed. When the measuring range is extended to the maximum of about 1.2 mm, the resolution of the capacitance sensor drops to 0.5 nm. On the other hand, the best commercial available laser interferometer system has 0.6 nm resolution with a size of 100 mm×100 mm×500 mm.

Accordingly, it is an object of the present invention to provide a new and improved compact laser Doppler encoder that is capable of measuring angular movements in the sub-nano-radian range and linear measurements in the sub-nano-meter range.

It is another object of the present invention to provide a new and improved laser Doppler encoder having very precise resolution of linear and angular rotation measurements by determining how the displacement of a target affects a laser beam that is transmitted through a self-aligning, multiple reflective optical path.

It is yet another object of the present invention to provide a new and improved laser Doppler encoder having a set of prisms on a fixed base and a set of prisms on a moving base so that the beam generated by a laser on the fixed base is reflected a substantial number of times between the prisms on the fixed and moving bases to increase the resolution of the encoder.

It is still another object of the present invention to provide a new and improved laser Doppler angular encoder for use with a high energy resolution monochromator and a laser Doppler linear encoder for use in the fields of X-ray lithography, large-field scanning microscopes, X-ray microscopes and X-ray micromachining.

Yet another object of the present invention is to provide a new and improved laser Doppler distance meter that is used with a closed loop feedback circuit to control a motion reduction mechanism to precisely position a movable base with respect to a stationary base.

SUMMARY OF THE INVENTION

In accordance with these and many other objects of the present invention, a laser Doppler encoder embodying the present invention includes at least two sets of reflecting prisms. One of the sets of prisms includes three right angle triangular prisms that are mounted on a fixed base along with an additional prism, an end retroreflector and a laser/detector. The second set of prisms includes another three right angle triangular prisms that are mounted on a moving/rotating base (the base can be moved linearly with respect to the fixed base in which case the laser Doppler encoder would be a laser Doppler linear encoder (LDLE) or can be moved angularly with respect to the fixed base in which case the laser Doppler encoder would be a laser Doppler angular encoder (LDAE)). The laser/detector generates a laser beam that is transmitted through the sets of prisms on the fixed and moving bases as well as the additional prism and the end retroreflector until the laser beam finally reaches a heterodyning detector that is housed coaxially inside the laser/detector. The laser beam is a frequency-stabilized laser beam such that the laser beam that is reflected back to the heterodyning detector is frequency-shifted by the movement of the moving base relative to the fixed base so that the amount of movement (either rotational or linear) of the moving base can be accurately determined. Moreover, the end retroreflector enables the laser Doppler encoder to be readily self-aligned such that the alignment time is substantially reduced. In addition, the three-dimensional optical path configuration results in a compact and integrated optical design which optimizes the system's anti-vibration performance that is critical for sub-nano-radian and subAngstrom resolution in measurements.

In the embodiment of the present invention where the first and second sets of prisms each includes three right angle triangular prisms, the laser beam is reflected twenty-four times between the set of prisms on the fixed base and the set of prisms on the moving base. In an alternate embodiment of the present invention, each of the first and second sets of prisms may include an additional number of prisms. In a case where each of the sets of prisms includes five right angle triangular prisms, the laser beam is reflected forty times between the set of prisms on the fixed base and the set of prisms on the moving base. Alternatively, two sets of three reflecting prisms can be mounted on the fixed base and another two sets of three reflecting prisms can be mounted on the moving base by having the two sets on each of the bases in parallel, spaced apart planes. In such a case, the laser Doppler encoder still can be made relatively compact in size, but the laser beam is reflected forty-eight times for further resolution of the displacement measurements being made.

In one embodiment of the present invention, the laser Doppler encoder is a laser Doppler angular encoder that is used in conjunction with a high energy resolution monochromator for accurately determining the rotational movement of an arm in the monochromator. The laser Doppler angular encoder also can be used in conjunction with a closed looped motion controller for providing feedback on the rotational displacement of the arm of the monochromator so that the arm can be accurately positioned.

BRIEF DESCRIPTION OF THE DRAWINGS

These and many other objects and advantages of the present invention will become readily apparent from consideration of the following detailed description of the embodiment of the invention shown in the accompanying drawing wherein:

FIG. 7 is a schematic illustration of a laser Doppler encoder embodying the present invention that is similar to the laser Doppler encoder of FIG. 1 but includes additional reflecting prisms disposed in spaced apart, parallel planes.

DETAILED DESCRIPTION OF THE PREFERRED EMBODIMENT

Figure 1:
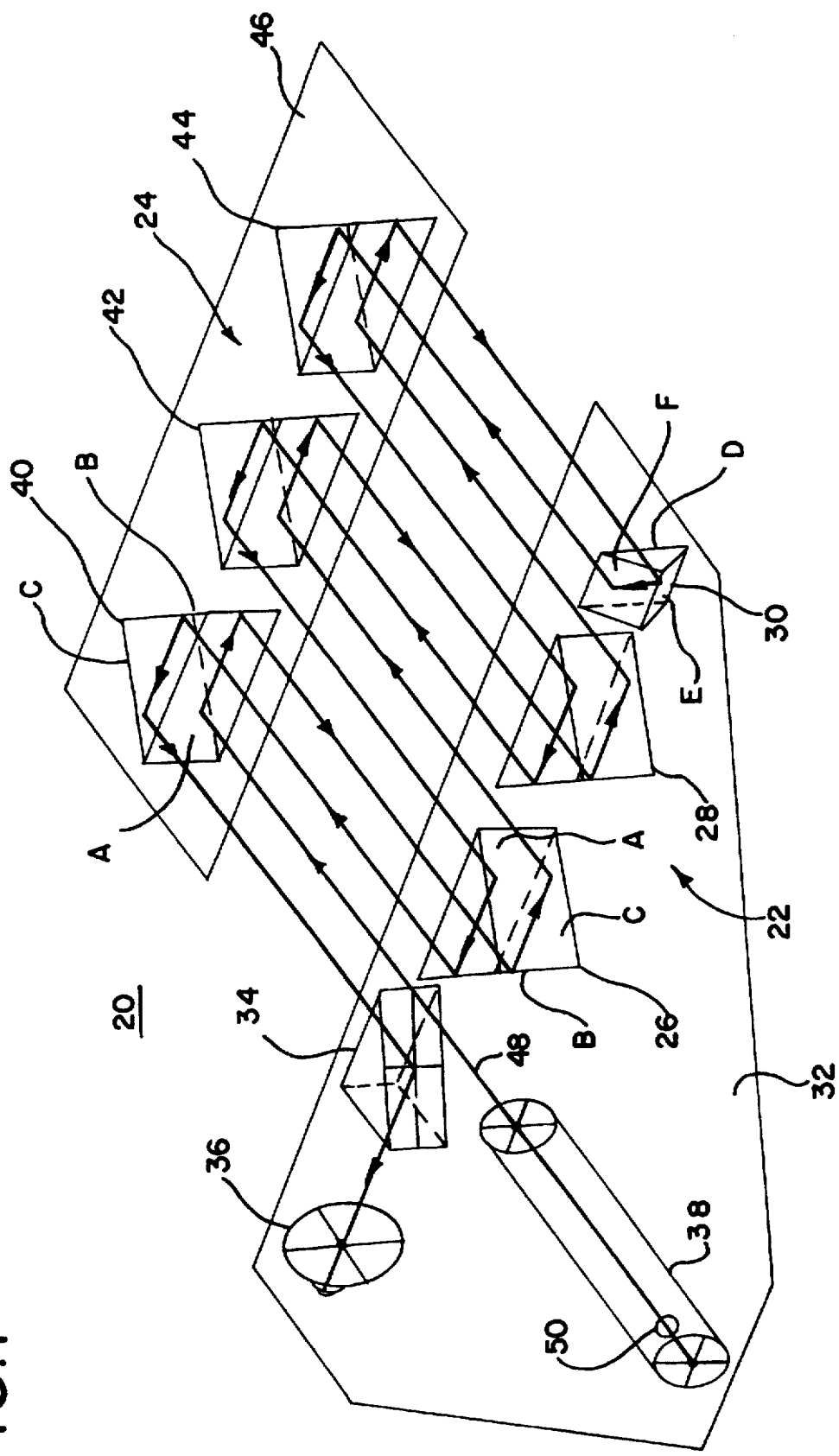
FIG. 1 is a schematic illustration of a laser Doppler encoder embodying the present invention.

Referring now more specifically to FIG. 1, therein is disclosed a schematic illustration of a laser Doppler encoder that is generally designated by the reference numeral 20 and that embodies the present invention. In general, FIG. 1 illustrates the working principle of the laser Doppler encoder 20 which includes at least two sets of reflecting prisms 22 and 24. The set of prisms 22 includes right angle triangular prisms 26, 28, and 30 that are mounted on a fixed base 32 along with an additional right angle triangular prism 34, an end retroreflector 36 and a laser/detector 38. The second set of prisms 24 includes right angle triangular prisms 40, 42, and 44 that are mounted on a moving/rotating base 46 (in the illustrated embodiment of FIG. 1, the base 46 can be moved linearly with respect to the fixed base 32 in which case the laser Doppler encoder 20 would be a laser Doppler linear encoder (LDLE) or can be moved angularly with respect to the fixed base 32 in which case the laser Doppler encoder 20 would be a laser Doppler angular encoder (LDAE)). The laser/detector 38 generates a laser beam 48 that is transmitted initially to a lower portion of the prism 40, then reflected in the lower portions of the prisms 26, 42, 28, and 44 until the beam 48 reaches the lower portion of the prism 30. The beam 48 that is reflected onto the prism 30 is shifted vertically within the prism 30 and transmitted to an upper portion of the prism 44. Thereafter, the beam 48 is reflected on the upper portions of the prisms 44, 28, 42, 26 and 40. The beam 48 then is reflected by the prism 40 to the prism 34 that in turn directs the beam 48 to the end retroreflector 36.

Upon impinging on the end retroreflector 36, the laser beam 48 is reflected back along essentially the same optical path to the laser/detector 38 (i.e., through the prism 34, through the upper portions of prisms 40, 26, 42, 28, 44, and 30, to the lower portion of the prism 30, and through the lower portions of the prisms 44, 28, 42, 26, and 40) until the laser beam 48 finally reaches a heterodyning detector 50 that is housed coaxially inside the laser/detector 38. The laser beam 48 is a frequency-stabilized laser beam such that the laser beam 48 that is reflected back to the heterodyning detector 50 is frequency-shifted by the movement of the base 46 relative to the fixed base 32 so that the amount of movement (either rotational or linear) of the base 46 can be accurately determined based on the shift in the frequency of the reflected laser beam 48.

In view of the fact that the laser beam 48 is reflected in the same optical path once in one direction and a second time in the opposite direction, any troublesome air turbulence and acoustic noise effects that might adversely affect the travel of the laser beam 48, and thereby the resolution and accuracy of the laser Doppler encoder 20, are canceled. Consequently, the multiple reflection, optically designed laser Doppler encoder 20 provides a system that is essentially stable regardless of environmental effects. Moreover, the use of the prism 34 and the end retroreflector 36 enables the laser Doppler encoder 20 to be readily self-aligned such that the alignment time is substantially reduced. In addition, the three-dimensional optical path configuration results in a compact and integrated optical design which optimizes the system's anti-vibration performance that is critical for sub-nano-radian and subAngstrom resolution in measurements.

The laser beam 48 is generated by the laser/detector 38. The laser beam 48 so generated may be a conventional frequency stabilized He—Ne (Helium-Neon) laser beam. The detector 50 is a polarization insensitive heterodyning detector having electronics to calculate the displacement of the movable base 46 based on the frequency of the laser beam 48 as it is reflected back to the laser/detector 38. While the laser Doppler encoder 20 utilizes the principles of a laser Doppler displacement meter, the laser beam 48 is being reflected twenty-four times between the fixed base 32 and the movable base 46 so that as compared to a laser Doppler displacement meter where the laser beam is reflected a single time off the target being measured, the resolution can be twelve-times as great. In this regard, the optical path over which the laser beam 48 travels is significantly longer than in the case of a single reflection laser Doppler displacement meter, but yet the laser Doppler encoder 20 can be relatively compact in size due to the use of prisms, such as the sets of prisms 22 and 24, to provide the longer optical path in a relatively compact space.

The prisms 26, 28, 30, 34, 40, 42, and 44 are relatively typical right angle triangular prisms that can be provided with special coatings to optimize the reflective surfaces of the prism. In some special cases where improved control over the angle of reflection is desired, the prisms 26, 28, 30, 34, 40, 42, and 44 can be retroreflectors. As is illustrated with respect to prisms 26 and 40, each of the prisms 26, 28, 40, 42, and 44 have surfaces A, B, C. The laser beam 48 enters through the surface A, is reflected from one of the surfaces B and C to the other of the surfaces B or C. The laser beam 48 then is reflected from the surface B or C out through the surface A. As is further illustrated in FIG. 1, the laser beam 48 enters through either the lower portion of the surface A and exists the other side at the same lower portion of the surface A or enters through the upper portion of the surface A and exists the other side at the same upper portion of the surface A. On the other hand, the prism 30 has surfaces D, E, and F. The laser beam 48 enters the surface D and when impinging on the surface E or F is displaced vertically to the other of the surfaces E or F and then out through the surface D. Consequently, when the laser beam 48 enters the lower portion of the surface D, it exists out from the upper portion of the surface D and when it enters the upper portion of the surface D, it exists out from the lower portion of the surface D. In this way, the laser beam 48 is reflected in spaced apart parallel planes so that it can be reflected twice between each of the prisms in the sets 22 and 24 both when it is traveling from the laser/detector 38 and when it is returning to the laser/detector 38 without the beams interfering with each other.

The prism 34 alters the direction of the laser beam 48 so that the laser beam 48 is directed to the end retroreflector 36 as it is reflected from the prism 40 or is directed to the prism 40 after the laser beam 48 is reflected from the retroreflector 36. The retroreflector 36 provides a self-alignment feature to the laser Doppler encoder 20. The retroreflector 36 is designed so that the laser beam 48 is reflected back along the same path that it has traveled from the laser/detector 38 to the retroreflector 36 even though the laser beam 48 enters the retroreflector 36 at a slight angle. The fact that the laser beam 48 is traveling along the identical optical path both when it is traveling from the laser/detector 38 to the end retroreflector 36 and then back from the end retroreflector 36 to the laser/detector 38 results in the laser beam 48 being reflected in the same optical path twice in opposite directions thereby canceling any detrimental affects from air turbulence, acoustic noise and the like.

As can be appreciated from in particular FIG. 1, the optical path over which the laser beam 48 travels from the laser/detector 38 to the end retroreflector 36 and then back again to the laser/detector 38 provides for twenty-four reflections of the laser beam 48 within the laser Doppler encoder 20 between prisms disposed on the fixed base 32 and the moving base 46 thereby increasing the overall path length that the laser beam 48 travels. By having this increased path length, the sensitivity or resolution of the laser Doppler encoder 20 is increased significantly over that of a laser Doppler distance meter with a single reflection from a moving target. However, the laser Doppler encoder 20 can be made relative compact because the path length is not just a simple path from the source of the laser beam to a target and back again to the source of the laser beam.

Figure 2:
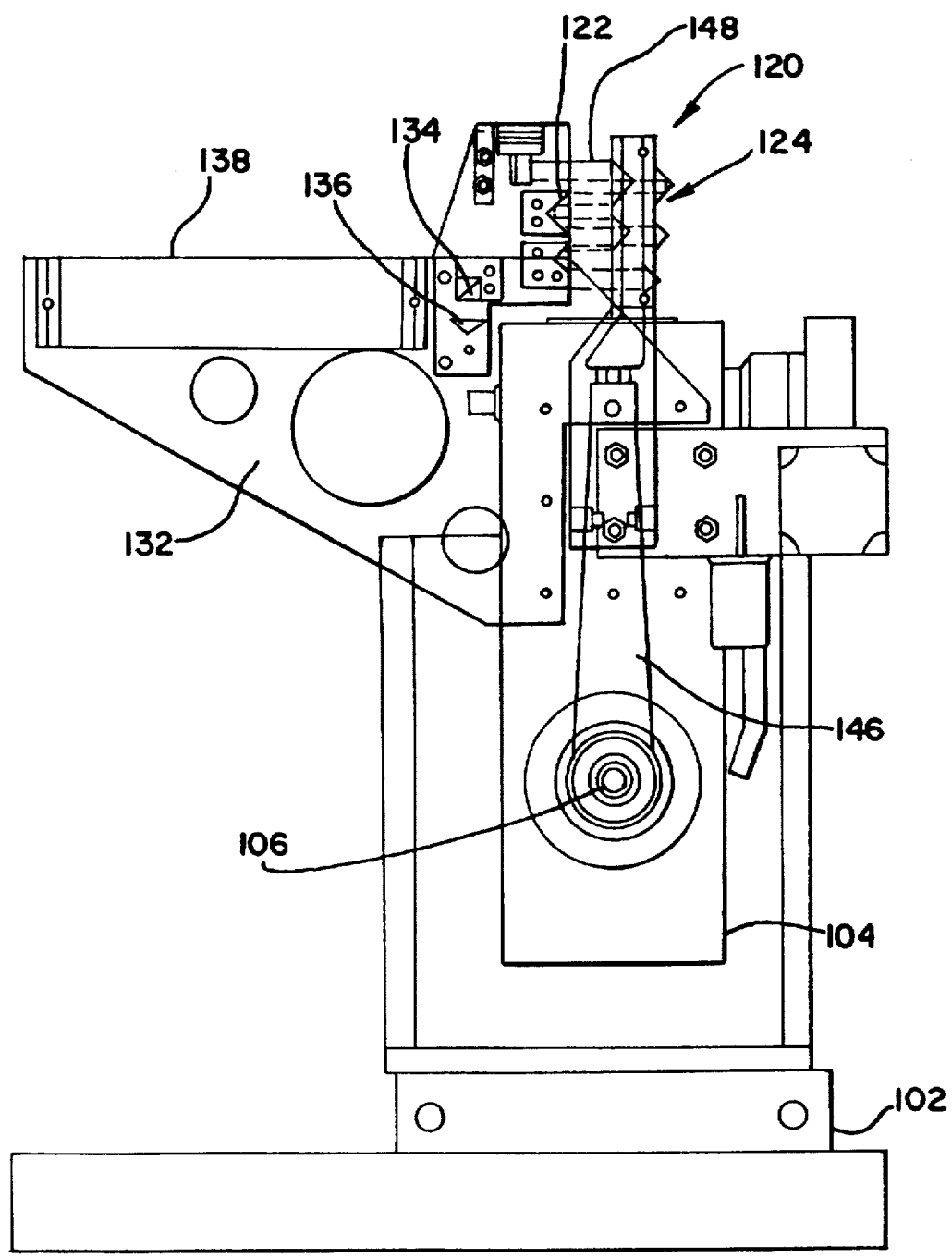
FIG. 2 is a side elevation view of a high energy resolution crystal monochromator utilizing a laser Doppler angular encoder of the type illustrated in FIG. 1.

The type of laser Doppler encoder 20 illustrated in FIG. 1 can be used on a high energy resolution crystal monochromator of the type shown in FIG. 2 of the drawings and designated by the reference numeral 100. The crystal monochromator 100 utilizes a laser Doppler angular encoder 120 that includes essentially the same components utilized in the laser Doppler encoder 20, but the components are positioned on the monochromator 100. Due to the fact that the laser Doppler angular encoder 120 includes components that are the same as or correspond to the components of the laser Doppler encoder 20, components of the laser Doppler angular encoder 120 that are specifically referred to herein are numbered with the same reference numerals as the corresponding components in the laser Doppler encoder 20 except that they are increased by the quantity 100.

In such a crystal monochromator 100, the energy in an X-ray beam is varied in extremely small increments to provide a scan of energies for passage through a crystalline sample. A peak signal from the sample is detected at a particular energy measurement so that the resulting data can be used to determine atomic or other structural characteristics for the sample. Measurement of the distance (or the change in distance) between a rotary arm and a stationary base is used to calculate the energy of the beam. Particularly when the monochromator 100 is used to determine extremely small linear or angular values associated with atomic distances, it is very important that the measurement of the position of the rotary arm be accurate to values in the order of sub-nano-meters or sub-nano-radians. Consequently, the laser Doppler angular encoder 120 can be utilized to provide such accurate and precise measurements.

The monochromator 100 includes a base 102 from which extends a support structure 104. A rotatable shaft 106 extends from the support structure 104 and is adapted to rotate an arm 146. A crystalline sample is placed on the arm 146 and the arm 146 is rotated so that its position with respect to an X-ray beam can be varied in extremely small increments. These small increments are measured by the laser Doppler angular encoder 120 which includes a set of prisms 124 on the rotating arm 146 and another set of prisms 122 on a fixed base 132 that is secured to and extends from the support structure 104 of the monochromator 100. The fixed base 132 additionally has thereon a prism 134 that directs a laser beam 148 from the sets of prisms 122 and 124 to an end retroreflector 136 that is also mounted on the fixed base 132. The laser beam 148 is generated by a laser/detector 138 that is mounted on the fixed base 132.

As was the case with respect to the laser Doppler encoder 20 illustrated in FIG. 1, the laser beam 148 emanates from the laser/detector 138 and is reflected through the sets of prisms 122 and 124 (the set of prisms 122 can include prisms similar to prisms 26, 28 and 30 in the laser Doppler encoder 20 and the set of prisms 124 can include prisms similar to prisms 40, 42 and 44 in the laser Doppler encoder 20) and the prism 134 and reflected back from the end retroreflector 136 through the prism 134 and the sets of prisms 122 and 124 to the laser/detector 138. The laser/detector 138 determines from the reflected laser beam 148 the distance the rotating arm 146 has been moved with respect to the fixed base 132 by analyzing the frequency of the laser beam 148 that has been reflected back to the laser/detector 138 in part through the set of prisms 124 on the rotating arm 146. As was discussed with respect to the laser Doppler encoder 20, the laser Doppler angular encoder 120 can be made relatively compact in size, but the resolution can nevertheless be in the sub-nano-meter or sub-nano-radian range due to the fact that the laser beam 148 travels over a substantial distance and any detrimental affects are canceled due to the fact that the laser beam 148 travels in opposite directions over the same optical path.

Figure 3:
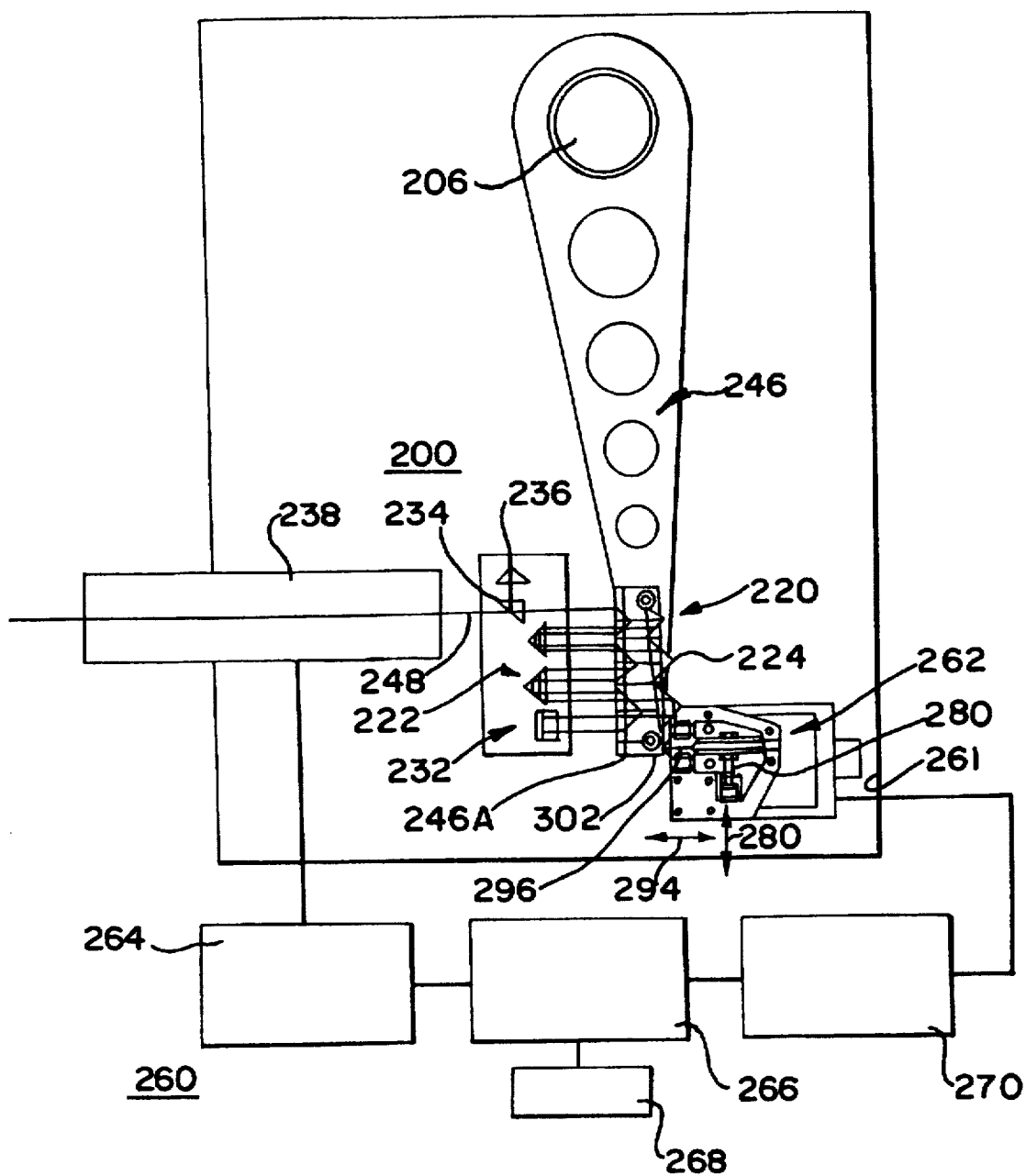
FIG. 3 is a diagrammatic illustration of a closed loop motion controller for controlling a motion reduction mechanism used with a monochromator, the motion controller utilizing a laser Doppler angular encoder of the type illustrated in FIG. 1 to provide feedback of the position of a component of the monochromator.

The laser Doppler angular encoder 120 can be used in not only determining the position of the arm 146 in the case of the crystal monochromator 100, but can be used in actually positioning that arm 146. In this regard, reference is made to FIG. 3 wherein a crystal monochromator 200 is disclosed. The monochromator 200 includes components that are the same as or correspond to the components of monochromator 100 including components of a laser Doppler angular encoder 220 that correspond to components of the laser Doppler angular encoder 120 illustrated in FIG. 2. Consequently, those components of the monochromator 200 that correspond to components of the monochromator 100 and/or the laser Doppler angular encoder 120 that are specifically referred to herein are numbered with the same reference numerals as the corresponding components in the monochromator 100 and/or the laser Doppler angular encoder 120 except that they are increased by the quantity 100.

The monochromator 200 includes an arm 246 that is rotated about a shaft 206. A crystalline sample is placed on the arm 246 and the arm 246 is rotated with respect to the shaft 206 so that its position with respect to an X-ray beam can be varied in extremely small increments. These small increments are measured by the laser Doppler angular encoder 220 which includes a set of prisms 224 on the rotating arm 246 and another set of prisms 222 on a fixed base 232. The fixed base 232 additionally has thereon a prism 234 that directs a laser beam 248 from the sets of prisms 222 and 224 to an end retroreflector 236 that is also mounted on the fixed base 232. The laser beam 248 is generated by a laser/detector 238 that is mounted on the fixed base 232. As was the case with respect to the laser Doppler angular encoder 120 illustrated in FIG. 2, the laser beam 248 emanates from the laser/detector 238 and is reflected through the sets of prisms 222 and 224 and the prism 234 and reflected back from the end retroreflector 236 through the prism 234 and the sets of prisms 222 and 224 to the laser/detector 238. The laser/detector 238 determines from the reflected laser beam 248 the distance the rotating arm 246 has been moved with respect to the fixed base 232 by analyzing the frequency of the laser beam 248 that has been reflected back to the laser/detector 238 in part through the set of prisms 224 on the rotating arm 246.

The data from the laser/detector 238 as to the amount of angular motion of the arm 246 can be used in a feedback circuit 260 that is used in conjunction with the laser Doppler angular encoder 220, a stepping motor or DC driven stage or slide 261 and a motion reduction mechanism 262 to control the displacement or angular rotation of the arm 246. The data detected at the laser/detector 238 is fed to a laser Doppler displacement meter controller 264 which in turn provides the displacement information as to the arm 246 to a digital signal processing device 266 that essentially is a feedback controller under the control of a control computer 268. Based on the displacement data being received by the feedback controller 266 from the laser Doppler displacement meter controller 264 and the displacement amount desired as determined by the control computer 268, the feedback controller 266 actuates a stepping motor and piezo-electric driver 270. The piezo-electric driver 270 drives the stage 261 and the motion reduction mechanism 262 which in turn moves an end portion 246A of the arm 246 so that the arm 246 is rotated about the shaft 206 with sub-nano-radian resolution.

The stage 261 is driven towards the end portion 246A of the arm 246 in response to signals provided by the the driver 270. The movement of the stage 261 results in a relatively large movement of the arm 246 about the shaft 206 (for example, as much as eight degrees of angular movement) whereas the motion reduction mechanism 262 provides a very precise additional resolution of the angular rotation of the arm 246 (for example, in the sub-nano-radian range). Hence, the use of the feedback circuit 260 to control both the stage 261 and the motion reduction mechanism 262 based on the data on the motion of the arm 246 that is determined by the laser Doppler angular encoder 220 provides a motion controller that can control the rotational movement with sub-nano-radian resolution in an eight degree range of rotational movement.

Figure 4:
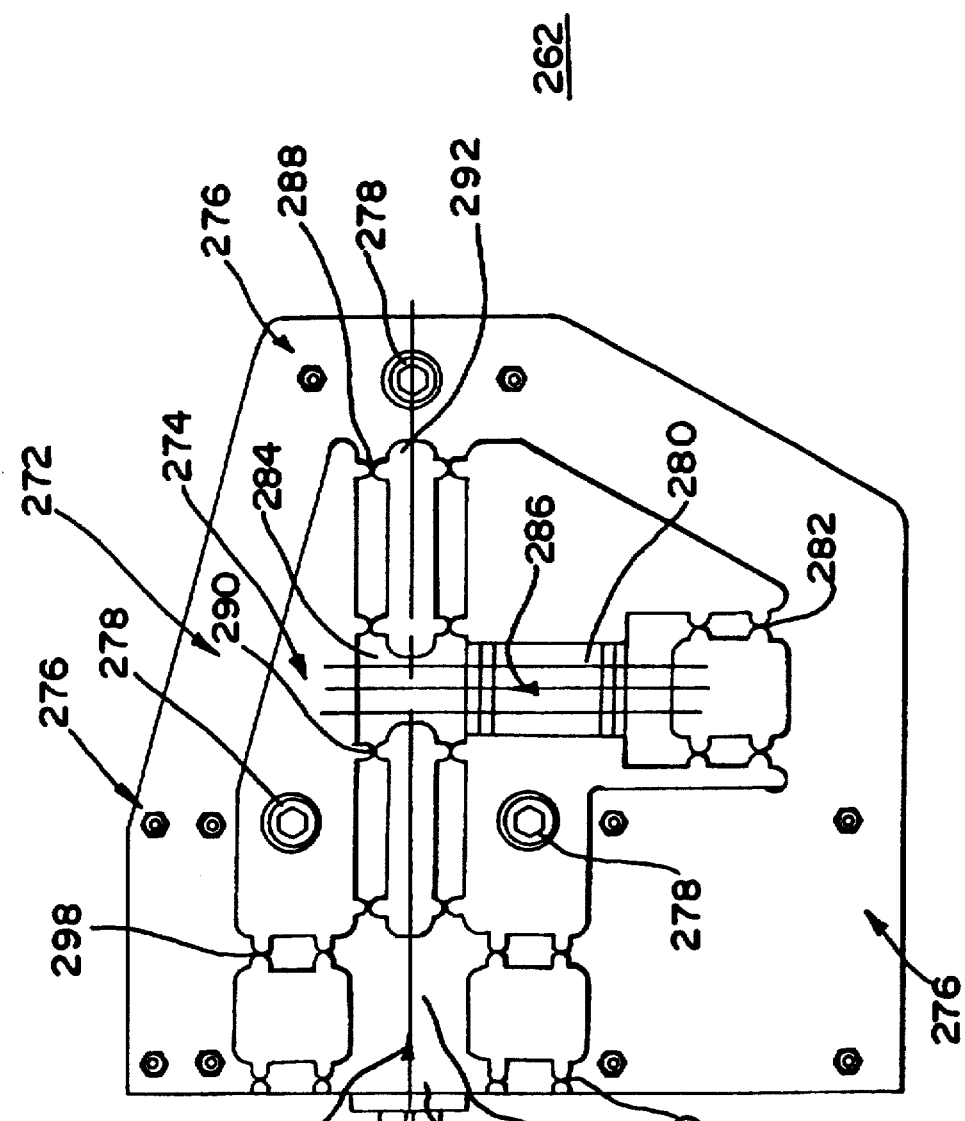
FIG. 4 is a diagrammatic top view of the motion reduction mechanism illustrated in FIG. 3.
Figure 5:
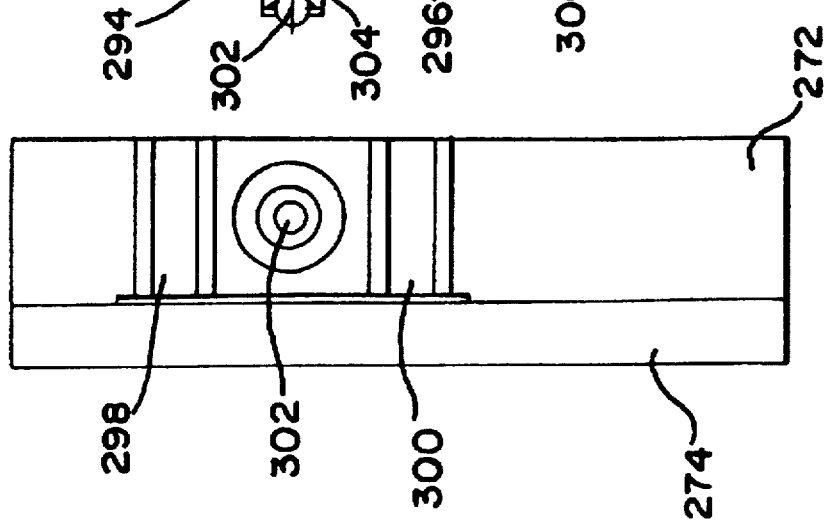
FIG. 5 is a side view of the motion reduction mechanism illustrated in FIG. 4.

The motion reduction mechanism 262 is further illustrated in FIGS. 4 and 5 of the drawings and includes a base frame 272 that is secured to a base plate 274 by fasteners 276. The base plate 274 is in turn secured to the stage 261 by fasteners 278. The output of the piezo-electric driver 270 is coupled to a piezo-electrical transducer 280 that is disposed between a flexible linkage 282 and an input block 284. In response to the output of the piezo-electric drive 270 supplying an energizing signal to the piezo-electrical transducer 280, the piezo-electrical transducer 280 expands so that the input block 284 tends to be moved in the direction of an arrow 286. This is due to the fact that the linkage 282 is generally inflexible or stiff in the direction of the arrow 286 such that as the piezo-electric transducer 280 is moved in the direction of the arrow 286, the input block 284 also will be moved in the direction of the arrow 286 away from the linkage 282.

The input block 284 is secured between an flexible linkage 288 and an flexible linkage 290. As the input block 284 is forced to move in the direction of the arrow 286 in response to the expansion of the piezo-electric transducer 280, the motion of the input block 284 translates into a motion in a direction perpendicular to the direction of the arrow 286. This is due to the fact that the linkage 288 is secured to the base frame 272 at a distal end 292 so that as the input block 284 is forced to move in the direction of the arrow 286 the flexible linkage 290 is moved in the direction of an arrow 294. The movement of the linkage 290 in the direction of the arrow 294 results in the movement of an output block 296 also in the direction of the arrow 294. The output block 296 is permitted to move in the direction of the arrow 294, but not perpendicularly with respect to that direction due to the fact that it is sandwiched between flexible linkages 298 and 300, both of which are flexible in the direction of the arrow 296, but inflexible or stiff in the directions perpendicular thereto. The output block 296 has a coupling 302 at a distal end 304 so that the output block 296 can engage the arm 246 at its end 246A. As a result, the movement of the output block 296 in the direction of the arrow 294 will cause the arm 246 to rotate about the shaft 206.

The motion reduction mechanism 262 is based on the effect of a flexural parallelogram in that a relatively large movement of the piezo-electric transducer 280 in the direction of the arrow 286 is translated into a significantly lesser movement of the output block 296 in the direction of the arrow 294. For example, a 100 micron movement of the piezo-electric transducer 280 in the direction of the arrow 286 results in a 1 micron movement of the output block 296 in the direction of the arrow 294. This ratio could even be increased two fold so that a 200 micron movement of the piezo-electric transducer 280 translates into a 1 micron movement of the output block 296. As a result, the motion reduction mechanism 262 can very precisely control the rotation of the arm 246 about the shaft 206. Moreover, the motion reduction mechanism 262 has little or no flexibility in the direction of the arrow 294 (in this regard, the output block 296 is sandwiched between the linkages 298 and 300) so that the mechanism 262 effectively provides a precision linear motion driver.

Figure 6:
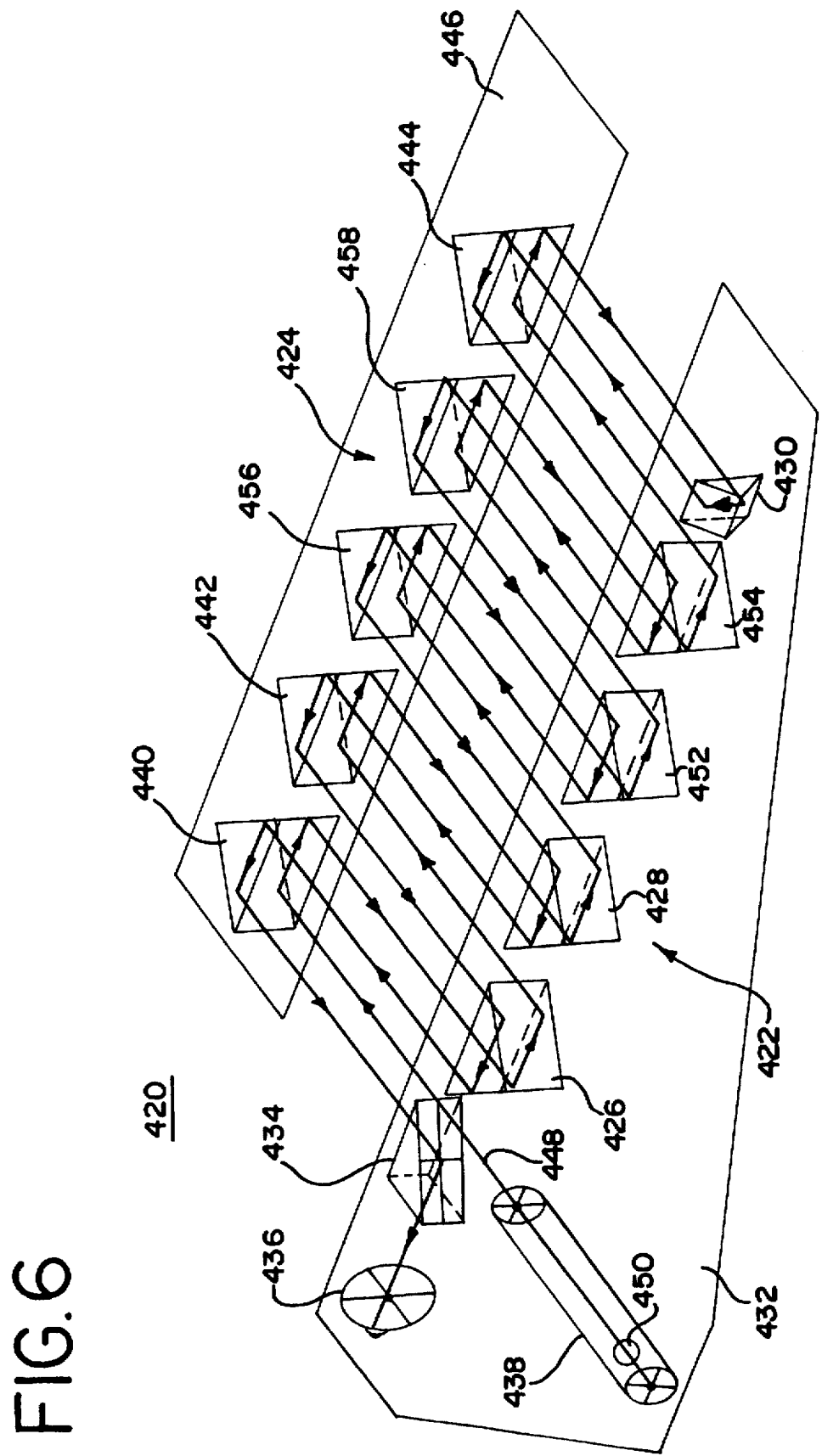
FIG. 6 is a schematic illustration of a laser Doppler encoder embodying the present invention that is similar to the laser Doppler encoder of FIG. 1 but includes additional reflecting prisms.

In order to increase the resolution of the laser Doppler encoder 20 illustrated in FIG. 1 of the drawings, additional prisms can be added to the set of prisms 22 on the fixed base 32 and the set of prisms 24 on the moving base 46. One such improved resolution laser Doppler encoder 420 is illustrated in FIG. 6 of the drawings. The laser Doppler encoder 420 includes essentially the same components utilized in the laser Doppler encoder 20, but with additional prisms. Due to the fact that the laser Doppler encoder 420 includes components that are the same as or correspond to the components of the laser Doppler encoder 20, components of the laser Doppler encoder 420 that are specifically referred to herein are numbered with the same reference numerals as the corresponding components in the laser Doppler encoder 20 except that they are increased by the quantity 400.

The laser Doppler encoder 420 includes two sets of reflecting prisms 422 and 424. The set of prisms 422 includes right angle triangular prisms 426, 428, 452, 454 and 430 that are mounted on a fixed base 432 along with an additional right angle triangular prism 434, an end retroreflector 436 and a laser/detector 438. The second set of prisms 424 includes right angle triangular prisms 440, 442, 456, 458 and 444 that are mounted on a moving/rotating base 446 (as was the case with respect to the laser Doppler encoder 20, the illustrated embodiment of FIG. 6 can be a laser Doppler linear encoder (LDLE) if the base 446 is moved linearly with respect to the fixed base 432 or a laser Doppler angular encoder (LDAE) if the base 446 is moved angularly with respect to the fixed base 432). The laser/detector 438 generates a laser beam 448 that is transmitted initially to a lower portion of the prism 440, then reflected in the lower portions of the prisms 426, 442, 428, 456, 452, 458, 454, and 444 until the beam 448 reaches the lower portion of the prism 430. The beam 448 that is reflected onto the prism 430 is shifted vertically within the prism 430 and transmitted to an upper portion of the prism 444. Thereafter, the beam 448 is reflected on the upper portions of the prisms 444, 454, 458, 452, 456, 428, 442, 426 and 440. The beam 448 then is reflected by the prism 440 to the prism 434 that in turn directs the beam 448 to the end retroreflector 436.

Upon impinging on the end retroreflector 436, the laser beam 448 is reflected back along essentially the same optical path to the laser/detector 438 (i.e., through the prism 434, through the upper portions of prisms 440, 426, 442, 428, 456, 452, 458, 454, and 444 to the lower portion of the prism 430, and through the lower portions of the prisms 444, 454, 458, 452, 456, 428, 442, 426 and 440) until the laser beam 448 finally reaches a heterodyning detector 450 that is housed coaxially inside the laser/detector 438. The laser beam 448 is a frequency-stabilized laser beam such that the laser beam 448 that is reflected back to the heterodyning detector 450 is frequency-shifted by the movement of the base 446 relative to the fixed base 432 so that the amount of movement (either rotational or linear) of the base 446 can be accurately determined.

As was the case with respect to the laser Doppler encoder 20, the laser beam 448 in the laser Doppler encoder 420 is reflected in the same optical path once in one direction and a second time in the opposite direction such that any troublesome air turbulence and acoustic noise effects that might adversely affect the travel of the laser beam 448 and thereby the resolution and accuracy of the laser Doppler encoder 420 are canceled. The additional prisms 452, 454, 456, and 458 increase the number of reflections of the laser beam 448 to forty (as compared to twenty-four reflections in the laser Doppler encoder 20). This resulting increase in the effective length of the optical path over which the laser beam 448 travels enhances the resolution or performance of the laser Doppler encoder 420. However, the size of the laser Doppler encoder 420 nevertheless can be maintained relatively compact in size.

To further increase the resolution of the laser Doppler encoder 20 or 420 without increasing to any great extent the overall size of the encoder, additional prisms can be provided in spaced apart, parallel planes. For example, such a laser Doppler encoder 520 is illustrated in FIG. 7 of the drawings. The laser Doppler encoder 520 includes essentially the same components utilized in the laser Doppler encoder 20, but with additional prisms in spaced apart, parallel planes. Due to the fact that the laser Doppler encoder 520 includes components that are the same as or correspond to the components of the laser Doppler encoder 20, components of the laser Doppler encoder 520 that are specifically referred to herein are numbered with the same reference numerals as the corresponding components in the laser Doppler encoder 20 except that they are increased by the quantity 500.

The laser Doppler encoder 520 includes two sets of reflecting prisms 522 and 522A disposed in spaced apart, parallel planes on a fixed base 532 and two sets of reflecting prisms 524 and 524A disposed in the same spaced apart, parallel planes on a moving base 546. The set of prisms 522 includes right angle triangular prisms 526, 528, and 530 and the set of prisms 522A includes right angle triangular prisms 526A, 528A, and 530A. The sets of prisms 522 and 522A are mounted on the fixed base 532 along with additional right angle triangular prisms 534 and 535, an end retroreflector 536 and a laser/detector 538. It is noted that for illustrative purposes the sets of prisms 522A and 524A have been shown spaced apart a distance that leaves the impression that the set of prisms 522A, the prism 534 and the end retroreflector 536 are not mounted on the fixed base 532 when in fact they are fixed relative to the fixed base 532. Likewise, the set of prisms 524A is fixed to the moving base 546 even though the way the laser Doppler encoder 520 is illustrated in FIG. 7 it appears that the set of prisms 524A is not secured to the moving base 546. Moreover, the prism 535 is shown twice in FIG. 7 only for illustrative purposes when in fact only one prism 535 is included in the laser Doppler encoder 520.

The set of prisms 524 includes right angle triangular prisms 540, 542, and 544 and the set of prisms 524A includes prisms 540A, 542A and 544A. The sets of prisms 524 and 524A are both mounted on the moving/rotating base 546 (as was the case with respect to the laser Doppler encoder 20, the illustrated embodiment of FIG. 7 can be a laser Doppler linear encoder (LDLE) if the base 546 is moved linearly with respect to the fixed base 532 or a laser Doppler angular encoder (LDAE) if the base 546 is moved angularly with respect to the fixed base 532). The laser/detector 538 generates a laser beam 548 that is transmitted initially to a lower portion of the prism 540, then reflected in the lower portions of the prisms 526, 542, 528, and 544 until the beam 548 reaches the lower portion of the prism 530. The beam 548 that is reflected onto the prism 530 is shifted vertically within the prism 530 and transmitted to an upper portion of the prism 544. Thereafter, the beam 548 is reflected on the upper portions of the prisms 544, 528, 542, 526 and 540. The beam 548 then is reflected by the prism 540 to the prism 535 which in turn reflects the beam 548 to the lower portion of the prism 540A (the prism 535 alters the path of the laser beam 548 from the plane in which the sets of prisms 522 and 524 are disposed to the plane in which the sets of prisms 522A and 524A are disposed). The beam 548 is then reflected in the lower portions of the prisms 526A, 542A, 528A, and 544A until the beam 548 reaches the lower portion of the prism 530A. The beam 548 that is reflected onto the prism 530A is shifted vertically within the prism 530A and transmitted to an upper portion of the prism 544A. Thereafter, the beam 548 is reflected on the upper portions of the prisms 544A, 528A, 542A, 526A and 540. The beam 548 then is reflected to the prism 534 that in turn directs the beam 548 to the end retroreflector 536.

Upon impinging on the end retroreflector 536, the laser beam 548 is reflected back along essentially the same optical path to the laser/detector 538 (i.e., through the prism 534, through the upper portions of prisms 540A, 526A, 542A, 528A, and 544A to the lower portion of the prism 530A, through the lower portions of the prisms 544A, 528A, 542A, 526A and 540A, through the prism 535 and the upper portions of prisms 540, 526, 542, 528, and 544 to the lower portion of the prism 530, through the lower portions of the prisms 544, 528, 542A, 526 and 540) until the laser beam 548 finally reaches a heterodyning detector 550 that is housed coaxially inside the laser/detector 538. The laser beam 548 is a frequency-stabilized laser beam such that the laser beam 548 that is reflected back to the heterodyning detector 550 is frequency-shifted by the movement of the base 546 relative to the fixed base 532 so that the amount of movement (either rotational or linear) of the base 546 can be accurately determined.

As was the case with respect to the laser Doppler encoders 20 and 420, the laser beam 548 in the laser Doppler encoders 520 is reflected in the same optical path once in one direction and a second time in the opposite direction such that any troublesome air turbulence and acoustic noise effects that might adversely affect the travel of the laser beam 548 and thereby the resolution and accuracy of the laser Doppler encoder 520 are canceled. As compared to both of the encoders 20 and 420, the laser Doppler encoder 520 has additional prisms both on the fixed base 532 and the moving base 546 through which the laser beam 548 is reflected. The additional prisms increase the number of reflections of the laser beam 548 to forty-eight (as compared to twenty-four reflections in the case of the laser Doppler encoder 20 and forty reflections in the case of the laser Doppler encoder 420). This resulting increase in the effective length of the optical path over which the laser beam 548 travels enhances the resolution or performance of the laser Doppler encoder 520. However, the size of the laser Doppler encoder 520 nevertheless can be maintained relatively compact in size because the sets of prisms 522A and 524A are effectively stacked on top of the sets of prisms 522 and 524, respectively, by being positioned in a plane that is spaced apart, but parallel from the plane in which the sets of prisms 522 and 524 are disposed.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A displacement measuring device for measuring the displacement of a first base relative to a second base, said measuring device comprising:

a first plurality of reflective devices on said first base;

a second plurality of reflective devices on said second base;

an end reflective device;

a laser beam generating device for producing a laser beam; and a detection device on said first base for analyzing said laser beam, said laser beam being reflected by said first and second plurality of reflective devices to said end reflective device and being reflected from said end reflective device by said first and second plurality of reflective devices to said detection device whereby the displacement of said second base relative to said first base is determined based on the analysis of said laser beam by said detection device.

2. The displacement measuring device as set forth in claim 1 wherein said first plurality of reflecting devices includes at least three first prisms, wherein said second plurality of reflecting devices includes at least three second said prisms, and wherein said end reflective device is a retroreflector.

3. The displacement measuring device as set forth in claim 2 wherein said laser beam is reflected in a first plane as said laser beam travels in a first direction between said first and second prisms and is reflected in a spaced apart second plane as said laser beam travels in an opposite second direction between said first and second prisms.

4. The displacement measuring device as set forth in claim 3 wherein at least some of said first and second prisms have first and second reflecting portions and wherein said laser beam entering said first reflecting portion of said first and second prisms is reflected from said first reflecting portion and said laser beam entering said second reflecting portion of said first and second prisms is reflected from said second reflecting portion and wherein at least one of said first and second prisms having first and second spaced apart reflecting portions such that said laser beam entering said first spaced apart reflecting portion is reflected from said second spaced apart reflecting portion whereby said laser beam is reflected in said first plane as said laser beam travels in said first direction between said first and second prisms and is reflected in said second plane as said laser beam travels in said second direction between said first and second prisms.

5. The displacement measuring device as set forth in claim 1 wherein said laser beam is reflected by said first and second plurality of reflective devices in first and second opposite directions in spaced apart planes as said laser beam is transmitted to said end reflective device and is reflected by said first and second plurality of reflective devices in said first and second opposite directions in said spaced apart planes as said laser beam is reflected from said end reflective device to said detection device.

6. The displacement measuring device as set forth in claim 1 wherein said first plurality of reflecting devices includes a first set of prisms and a second set of prisms disposed spaced apart from said first set of prisms and said second plurality of reflecting devices includes a third set of prisms disposed spaced apart from a fourth set of prisms.

7. The displacement measuring device as set forth in claim 6 including an additional prism for altering the path through which the laser beam is traveling so that it is transmitted from said first and second sets of prisms to said third and fourth sets of prisms.

8. The displacement measuring device as set forth in claim 1 wherein said second base rotates with respect to said first base.

9. The displacement measuring device as set forth in claim 1 wherein said second base moves linearly with respect to said first base.

10. The displacement measuring device as set forth in claim 1 wherein said first base is a stationary support of a monochromator and said second base is an rotating arm of said monochromator that rotates with respect to said stationary support.

11. The displacement measuring device as set forth in claim 1 wherein said end reflective device, said laser beam generating device and said detection device are disposed on said first base.

12. A motion controller for controlling the relative movement of a first base with respect to a second base, said controller comprising:

a first plurality of reflective devices on said first base;

a second plurality of reflective devices on said second base;

an end reflective device;

a laser beam generating device for producing a laser beam;

a detection device for analyzing said laser beam, said laser beam being reflected by said first and second plurality of reflective devices to said end reflective device and being reflected from said end reflective device by said first and second plurality of reflective devices to said detection device;

a control circuit for receiving data from said detection device as to the displacement of said second base relative to said first base and providing a control signal based in part on said data; and a motion reduction mechanism for moving said second base in response to said control signal.

13. A motion controller as set forth in claim 12 wherein said motion reduction mechanism includes a transducer responsive to said control signal to move an input means in a first direction and includes an output means that moves in response to the movement of said input means in a second direction transverse to said first direction so as to move said second base.

14. A motion controller as set forth in claim 13 wherein said input and output means are constrained by flexible linkages so that said input means moves in said first direction and said output means moves in said second direction.

15. A motion controller as set forth in claim 13 wherein the ratio of movement between said input means and said output means is at least 1:100.

16. A method of determining the amount of movement of a first base relative to a second base comprising:

reflecting a laser beam by first portions of a first plurality of reflective devices on said first base and a first portion of a second plurality of reflective devices on said second base so that said laser beam travels in first and second opposite directions between said first and second plurality of reflective devices;

reflecting said laser beam from said first and second plurality of reflective devices to an end reflective device so that said laser beam is reflected back to said first and second plurality of reflective devices;

reflecting said laser beam by second portions of said first and second plurality of reflective devices so that said laser beam travels in first and second opposite directions between said first and second plurality of reflective devices; and analyzing said laser beam to determine the displacement of said second base relative to said first base.

17. The method as set forth in claim 16 wherein said laser beam is reflected by said first and second plurality of reflective devices in first and second opposite directions in spaced apart planes as said laser beam is transmitted to said end reflective device and is reflected by said first and second plurality of reflective devices in said first and second opposite directions in said spaced apart planes as said laser beam is reflected from said end reflective device to said detection device.

18. The method as set forth in claim 16 wherein said first plurality of reflecting devices includes a first set of prisms and a second set of prisms disposed spaced apart from said first set of prisms and said second plurality of reflecting devices includes a third set of prisms disposed spaced apart from a fourth set of prisms.

19. The method as set forth in claim 16 wherein said detection device supplies data to a control circuit as to the displacement of said second base relative to said first base, said control circuit providing a control signal based in part on said data to a motion reduction mechanism for moving said second base in response to said control signal.

20. The method as set forth in claim 19 wherein said motion reduction mechanism includes a transducer responsive to said control signal to move an input means in a first direction and includes an output means that moves in response to the movement of said input means in a second direction transverse to said first direction so as to move said second base.

* * * * *